US011131760B2

(12) United States Patent
Nosthoff et al.

(10) Patent No.: US 11,131,760 B2
(45) Date of Patent: Sep. 28, 2021

(54) METHOD AND APPARATUS FOR ESTABLISHING THE DISTANCE BETWEEN A VEHICLE AND AN INFRASTRUCTURE DEVICE

(71) Applicant: LAIRD BOCHUM GMBH, Bochum (DE)

(72) Inventors: Michael Nosthoff, Nuremberg (DE); Norbert Bauer, Nuremberg (DE); Thomas Seiboth, Nuremberg (DE); Jochen Nickles, Fuerth (DE); Ahmad El Assaad, Wolfsburg (DE)

(73) Assignee: Molex CVS Bochum GmbH, Bochum (DE)

( * ) Notice: Subject to any disclaimer, the term of this patent is extended or adjusted under 35 U.S.C. 154(b) by 338 days.

(21) Appl. No.: 16/315,068

(22) PCT Filed: Jul. 3, 2017

(86) PCT No.: PCT/EP2017/066415
§ 371 (c)(1),
(2) Date: Jan. 3, 2019

(87) PCT Pub. No.: WO2018/007275
PCT Pub. Date: Jan. 11, 2018

(65) Prior Publication Data
US 2019/0339355 A1    Nov. 7, 2019

(30) Foreign Application Priority Data

Jul. 4, 2016   (DE) .......................... 102016212136.7

(51) Int. Cl.
*G01S 11/02*    (2010.01)
*G01S 3/04*    (2006.01)
(Continued)

(52) U.S. Cl.
CPC .............. *G01S 11/02* (2013.01); *G01S 3/043* (2013.01); *G01S 5/04* (2013.01); *G01S 5/14* (2013.01); *G08G 1/164* (2013.01)

(58) Field of Classification Search
CPC ................................. G01S 11/02; G01S 3/048
See application file for complete search history.

(56) References Cited

U.S. PATENT DOCUMENTS 8,791,860 B2   7/2014  Edelhaeusser et al.
9,607,517 B2   3/2017  Schraebler et al.
(Continued)

FOREIGN PATENT DOCUMENTS

DE   102012221264 A1   5/2013
DE   102015210958 A1   1/2017
WO     2010128121 A1   11/2010

OTHER PUBLICATIONS

A. El Assaad, M. Krug and G. Fischer, "Distance and vehicle speed estimation in OFDM multipath channels," 2016 21st International Conference on Microwave, Radar and Wireless Communications (MIKON), Krakow, 2016, pp. 1-5, doi: 10.1109/MIKON.2016.7491943. (Year: 2016).*

(Continued)

*Primary Examiner* — Gregory C. Issing
(74) *Attorney, Agent, or Firm* — Laurence A. Greenberg; Werner H. Stemer; Ralph E. Locher

(57) ABSTRACT

A method and an apparatus establish a distance as well as to a vehicle. In the method for establishing a distance between a vehicle and an infrastructure device, at least two vehicle-mounted reception devices receive a signal transmitted by the infrastructure device. Each of the vehicle-mounted reception devices contains at least two antenna elements. For each reception device, a reception device-specific distance between the vehicle and the infrastructure device is established in accordance with the antenna signals generated (Continued)

by the antenna elements, and the shortest of all the reception device-specific distances is established as the distance.

20 Claims, 6 Drawing Sheets

(51) Int. Cl.
    *G01S 5/04*           (2006.01)
    *G01S 5/14*           (2006.01)
    *G08G 1/16*          (2006.01)

(56) References Cited

U.S. PATENT DOCUMENTS

| | | | | |
|---|---|---|---|---|
| 2010/0033339 | A1* | 2/2010 | Gurley | G01S 5/14 340/686.1 |
| 2010/0234071 | A1* | 9/2010 | Shabtay | H04B 7/155 455/562.1 |
| 2013/0031046 | A1* | 1/2013 | Huseth | G01S 3/74 706/52 |
| 2014/0056099 | A1* | 2/2014 | Hancock | A61B 8/445 367/11 |
| 2014/0247187 | A1* | 9/2014 | Harada | G01S 5/0273 342/465 |
| 2015/0346332 | A1 | 12/2015 | Tayler, Jr. et al. | |
| 2018/0364046 | A1 | 12/2018 | El Assad | |

OTHER PUBLICATIONS

Fredrik Gustafsson et al.: "Mobile Positioning Using Wireless Networks: Possibilities and fundamental limitations based on available wireless network measurements", IEEE Signal Processing Magazine, vol. 41, Jul. 2005, pp. 41-53.

Wu Bo: "Realization and Simulation of DOA estimation using MUSIC Algorithm with Uniform Circular Arrays", Environmental Electromagnetics, The 2006 4th Asia-Pacific Conference, CEEM' 2006, pp. 908-912.

A. El Assaad et al., "Distance and vehicle speed estimation in OFDM multipath channels", 2016 21st International Conference on microwave, radar and wireless communications (MIKON) (2016), 1-5.

* cited by examiner

METHOD AND APPARATUS FOR ESTABLISHING THE DISTANCE BETWEEN A VEHICLE AND AN INFRASTRUCTURE DEVICE

BACKGROUND OF THE INVENTION

Field of the Invention

The invention relates to a method and an apparatus for determining a distance between a vehicle and an infrastructure device, and to a vehicle. The invention also enables the determination of the vehicle position relative to a fixed location.

An exact self-localization for vehicles is desirable, for instance to enable new or improved functionalities in driver assistance systems. It may be desirable, for example, to enable a lane-maintaining vehicle navigation by means of a driver assistance system.

A position determination of the vehicle via so-called GNSS systems is known.

However, due to the masking of the necessary satellites, the accuracy of the position determination is not sufficient to implement the desired functionalities, especially in urban canyons and cities.

Also known are so-called RF-based methods for self-localization of vehicles. These are described, for example, in the paper "F. Gustafsson et al, Mobile positioning using wireless networks: possibilities and fundamental limitations based on available wireless network Me . . . , Signal Processing Magazine, IEEE (2005), 41-53".

Also known is DE 10 2015 210 958.5, published posterior. This discloses an apparatus and a method for determining a vehicle position in a fixed coordinate system centered on a transport node. The apparatus comprises at least one receiving device for receiving a signal of transmitting device at a traffic node, at least one device for determining a driving direction information in a global reference coordinate system, and at least one evaluation device. Part of the ego-position determination can involve determining a distance between the vehicle and an infrastructure device.

Document A. El Assaad et al., "Distance and vehicle speed estimation in OFDM multipath channels", 2016 21st International Conference on microwave, radar and wireless communications (MIKON) (2016), 1-5 describes a method for determining a distance for a receiving device.

SUMMARY OF THE INVENTION

A current technical problem is that of creating a method and an apparatus for determining a distance between a vehicle and an infrastructure device, and a vehicle, which enable a highly accurate determination of the distance.

The solution of the technical problem is obtained from the subject matters having the features of the independent claims. Further advantageous configurations of the invention are derived from the dependent claims.

A fundamental idea of the invention is to use received signals from a plurality of vehicle-mounted receiving devices in order to determine, for each receiving device, a distance between the vehicle and the infrastructure device which broadcasts the received signals. These vehicle-mounted receiving devices each comprise a plurality of antenna elements. The distance is then determined as the minimum possible distance of all the receiving device-specific distances.

A method is proposed for determining a distance between a vehicle and an infrastructure device. The method can also be used to determine a vehicle's position in a desired coordinate system, for example in a global reference coordinate system or in a fixed coordinate system relative to a transport node. This may, in particular, be an ego position determination. In addition, it is possible that in addition to the distance, a speed of the vehicle is also determined.

The infrastructure device in this context can refer to an infrastructure device which is arranged at a fixed position in the global reference coordinate system. This can be a transmitting device associated with the transport node, for example. The infrastructure device can also be referred to as a so-called roadside unit (RSU). The infrastructure device comprises at least one transmitting device for emitting signals, which hereafter are also referred to as transmitted signals. For sending and receiving signals, the infrastructure device can comprise, e.g. an antenna structure, in particular an omnidirectional antenna structure.

Furthermore, the infrastructure device may also comprise a receiving device for signals.

Transmitted signals can be used for information transfer between the infrastructure device and the vehicle. For example, user data can be transferred by means of the transmitted signals. Also, information can be transmitted on the position of the infrastructure device in the global reference coordinate system. Also, information relating to a time system of the infrastructure device can be transmitted, in particular a transmission time of the transmitted signal in this time system.

In this case, transmitted signals can be sent with predetermined transmission parameters. Transmission parameters may include, in particular, a transmission frequency, a bandwidth and/or a transmission power. For example, transmission signals with a frequency of 2.6 GHz and a bandwidth of 10 MHz can be sent.

The signals transmitted, and possibly also received, by the infrastructure device can also be, in particular, so-called OFDM signals. Such signals can be generated, in particular, by means of the so-called Orthogonal Frequency Division Multiplexing (OFDM) method. For example, the signals sent by the infrastructure device can be LTE signals. LTE signals (Long Term Evolution) can be used for signal transmission in accordance with the LTE mobile radio standard. However, the invention is not necessarily limited to such signals.

Using the signal sent by the infrastructure device (transmitted signal), it is possible to transmit, in particular, a fixed and therefore previously known reference symbol. The reference symbol used can have a fixed, and thus previously known phase angle, for example, a phase angle of 0°. The reference symbol can be transmitted periodically by the infrastructure device. A reference symbol may be in the form of or given by complex numbers, e.g. by the so-called InPhase and Quadrature data (IQ data). These can be provided specifically for the synchronization of the transmitter and receiver. These numbers can be transferred by different carriers of the transmitted signal, in particular at the same time. In the process it can be assumed that the reference symbol, in particular its properties, are known to a vehicle-mounted evaluation device. For example, these can be stored in the evaluation device or in an additional vehicle-mounted storage device. Therefore, the transmitted reference symbol can be determined from a received signal. This will be explained in more detail below.

According to the invention the signal sent by the infrastructure device is received by at least two vehicle-mounted receiving devices. Each vehicle-mounted receiving device comprises at least 2, but preferably more than 2, in particular up to 4, 8 or more antenna elements. Each antenna element of a receiving device receives the transmitted signal of the infrastructure device and generates an antenna signal (received antenna signal).

Each receiving device can therefore comprise an arrangement of a plurality of antenna elements and/or a plurality of arrays of antenna elements.

In addition to the antenna elements, the receiving device can also comprise elements for signal processing. For example, a receiving device can comprise at least one A/D converter device, but preferably one A/D converter per antenna element. Such an A/D-converter can be used to digitize an antenna signal. In particular, a digitized in-phase component and a digitized quadrature component of an antenna signal can be generated.

As explained in more detail below, the antenna elements of a receiving device can each be implemented as a flat antenna, patch antenna or a so-called panel antenna, or can form such an antenna structure. In this case, the plurality of antenna elements can be arranged in a plane or substantially in a plane.

Preferably, the antenna elements can be arranged in a circle, i.e. equidistant around a circular line. Alternatively, the antenna elements of a receiving device can be arranged linearly, i.e. along a straight line. Thus, a receiving device can comprise a so-called UCA (uniform circular array) antenna structure. Alternatively, the antenna elements of a receiving device can comprise a so-called ULA (uniform linear array) antenna structure.

A receiving device, in particular the arrangement of the at least two antenna elements of the receiving device, can be arranged in or on the vehicle. In particular, the antenna elements of one or all of the receiving devices can be antenna elements distributed in or on the vehicle.

The antenna elements, in particular the antenna elements of a receiving device, can be arranged in particular in or on non-metallic elements of the vehicle. For example, the antenna elements can be arranged in or on elements of a vehicle trim. For example, antenna elements can be arranged in or on a front or rear fender. Antenna elements can also be arranged in or on the vehicle roof. Antenna elements can also be arranged in a side or door trim. Also, antenna elements can be arranged on a windshield, in particular a front or rear windshield.

A linear arrangement of antenna elements, in particular a receiving device, can be arranged in or on the vehicle in such a way that a horizontal antenna arrangement or a vertical antenna arrangement is provided. In the case of a horizontal antenna arrangement, the straight line along which the antenna elements are arranged can be oriented parallel to a plane, wherein the plane is oriented perpendicular to the vehicle's vertical axis (yaw axis). In the case of a vertical antenna arrangement, the line along which the antenna elements are arranged can be arranged parallel or substantially parallel to the vehicle's vertical axis.

The use of linearly arranged antenna elements or circularly arranged antenna elements advantageously enables the accurate determination of a receiving direction of the transmitted signal, i.e. a direction along which the transmitted signal propagates in a direct path to the receiving device. The circular arrangement in this case advantageously enables both a determination of an azimuth angle as well as an elevation angle in relation to the circular plane. The horizontal antenna arrangement advantageously allows the determination of the azimuth angle, wherein the vertical antenna arrangement advantageously enables the determination of the elevation angle.

The receiving direction can be characterized by means of the azimuth angle and/or elevation angle.

The antenna elements of a receiving device can be, in particular, so-called monopole antenna elements.

Based on the receiving direction, a shortest connecting line can be determined between the receiving device, e.g. a reference point of the receiving device, and the infrastructure device, e.g. a reference point of the infrastructure device, which is also designated as a line of sight.

A position and/or orientation of a receiving device in a fixed vehicle-based coordinate system can be known in advance. This advantageously allows the shortest connecting line between a fixed reference point on the vehicle and the infrastructure device to be determined. The distance that is to be determined between the vehicle and the infrastructure device determined can be the distance between the fixed vehicle reference point and the infrastructure device.

One data transmission channel per receiving device can be present or provided on the vehicle.

For each receiving device, a receiving device-specific distance between the vehicle and the infrastructure device is determined as a function of the antenna signals generated by the antenna elements. It is possible that receive device-specific distances can be determined for different receiving devices. This may be the case, for example, if for one or more receiving devices the shortest connecting line between the receiving device and the infrastructure device is hidden by at least one object, such as another vehicle or a building. While in this case the corresponding receiving device may well be able to receive the transmitted signal from the infrastructure device, in particular as a result of reflections, an inaccurate distance will then nevertheless be determined, in particular due to the longer signal propagation time.

In addition, the distance is determined as the minimum possible distance of all the receiving device-specific distances. This advantageously ensures that inaccurately measured distances as a result of signal reflections are not determined as the resulting distance.

The use of a plurality of receiving devices and the determination of the minimum possible distance advantageously enables a highly accurate determination of the distance, wherein at the same time the determination is available over a long time.

Furthermore, depending on the distance determined in such a way and possibly also depending on the receiving direction of a transmission signal, as explained further below, it is possible to determine a position of the vehicle in the global reference coordinate system (ego-positioning).

The ego position may be determined, in particular, as a function of the position of infrastructure device in the global reference coordinate system, the distance from the vehicle to this infrastructure device and the receiving direction of the transmitted signal, in particular by the vehicle-mounted evaluation device.

The position of the infrastructure device can be known in advance, e.g. it can be stored in the vehicle-mounted evaluation device or in a vehicle-mounted storage device. The transmitted signal can also be used to transmit information about the position of the infrastructure device in the reference coordinate system to the vehicle-mounted control device.

In addition, information about the ego position of the vehicle and possibly also a vehicle speed can be transmitted by the vehicle to an external device. This can then control a traffic flow, for example, depending on this information.

In a further embodiment the antenna signals of a receiving device are digitized with a first sampling rate, at least temporarily. Furthermore, a signal start section of each digitized antenna signal is determined. The signal start section then only contains sample values that are generated by sampling at the first sampling rate. Further, the signal start sections are used as a basis for determining a receiving direction of the signal.

In particular, the MUSIC algorithm can be applied in order to determine the receiving direction of the signal. It is then possible to determine the receiving direction in the form of an azimuth and/or elevation angle. The MUSIC algorithm is described, for example, in the paper by Wu Bo, "Realization and Simulation of DOA estimation using MUSIC algorithm with Uniform Circular Arrays", Environmental Electromagnetics, The 2006 4th Asia-Pacific Conference (2006), 908-912. The method for determining the azimuth angle by means of the MUSIC algorithm for a ULA antenna is described in the paper by Schmidt, R. O., "Multiple emitter location and signal parameter estimation", Antennas and Propagation, IEEE Transactions, (1986), 276-280.

Of course, it is also possible to use other methods known to the person skilled in the art for the determination or computer-based estimation of the receiving direction.

The implementation of the MUSIC algorithm for antenna signals of a receiving device with antenna elements arranged in a circle is described in the paper by A. El Assaad et al., "Distance and vehicle speed estimation in OFDM multipath channels", 2016 21st International Conference on microwave, radar and wireless communications (MIKON) (2016), 1-5. If the receiving device comprises, for example, N antenna elements and the signal start section comprises M sample values, then the receiving direction is determined from N×M sample values.

For the digitization, each receiving device can comprise at least one A/D converter device, but preferably one A/D converter per antenna element. The A/D converter device(s) in this case can be referred to as so-called GSa/s converter devices. These can enable a sampling with a sampling rate in the range of 2 to 4 giga-samples per second.

It is possible that the receiving device or another device, such as an evaluation device, detects when a transmission signal is received from the infrastructure device. Starting from the detection time, which can be a starting time of the method, the transmission signal received by each antenna element (received antenna signal) can then be digitized with the first sampling rate. A signal start section can comprise all sample values that were generated in a time interval of predetermined length after the detection time or starting time of the method. Also, the signal start section can comprise a predetermined number of sample values, e.g., 10 to 100, preferably 20 to 50, more preferably 30 sample values.

A digitized antenna signal, as previously explained, can be generated in the form of a digitized in-phase component and quadrature component.

It can be assumed that the samples in the signal start section are not superimposed by reflected components of the transmission signal and thus corrupted. In particular, it can be assumed that the sample values of the signal start section were generated from a transmission signal that was transmitted over the shortest possible path from the infrastructure device to the receiving device ("line of sight"). The shortest path may be, in particular, a path along the previously described direct connecting line (line of sight).

The essential point is that only a limited number of sample values after the starting time of the sampling with the first sampling rate is used for determining the receiving direction of the transmitted signal. The sample values of an antenna signal that are no longer associated with the signal start section are therefore not used for determining the receiving direction. However, these sample values can be used for other functions, for example, for the transmission of user data and, as explained in more detail below, for determining the distance.

This advantageously results in as accurate a determination of the receiving direction as possible, which corresponds to the direction of the direct connecting line with high probability.

However, for this purpose it is advantageous to choose a very high sampling rate, in order to generate a signal start section that comprises enough sampling values in a short time, whose values are not distorted by reflections. In particular, the sampling rate can be higher, for example very much higher, than the Nyquist frequency which is required for loss-less sampling.

In a further embodiment, the sampling rate is reduced when a predetermined time interval after the beginning of the sampling with the first sampling rate has passed and/or when the signal start section comprises at least a predetermined number of sample values. In other words, the sampling rate is changed from the first sampling rate to a further sampling rate, wherein the further sampling rate is lower than the first sampling rate. This is carried out when a desired signal start section has been determined. This results advantageously in a reduction in the volume of data to be transferred and to be processed. This in turn enables processing with less computational effort, which also enables the processing to be speeded up.

In a further embodiment, from the antenna signals, in particular the digitized antenna signals, of a receiving device, a receiving device-specific line-of-sight signal is determined as a function of the receiving direction. This can also be referred to as the received signal of a receiving device. The receiving device-specific line-of-sight signal can also be referred to as an LOS signal (line-of-sight signal). This can also be referred to as spatial filtering.

The spatial filtering, i.e. the determination of the receiving device-specific line-of-sight signal from the antenna signals as a function of the receiving direction is also described in the paper by A. El Assaad et al., "Distance and vehicle speed estimation in OFDM multipath channels", 2016 21st International Conference on microwave, radar and wireless communications (MIKON) (2016), 1-5, in particular by formula 8 of Chapter III.A and the corresponding derivation. In the determination of the line-of-sight signal, the number of the N digitized antenna signals can be reduced to a digitized signal, namely the receiving device-specific line-of-sight signal.

In other words, the line-of-sight signal is extracted from the antenna signals of a receiving device.

This results in an advantageous way in a computational determination of a signal which was transmitted directly, i.e., in particular without reflections, by the infrastructure device to the receiving device and thus along the path with the distance to be determined.

In a further embodiment the receiving device-specific distance is determined as a function of the receiving device-specific line-of-sight signal.

In particular, the receiving device-specific distance can be determined in terms of the propagation time of the line-of-sight signal. For this purpose, the propagation time of the line-of-sight signal can be determined. This advantageously results in a reliable and accurate determination of the distance.

In a further embodiment a data symbol is extracted from the receiving device-specific line-of-sight signal, wherein the receiving device-specific distance is determined as a function of the data symbol, in particular, of the properties of the data symbol.

The extracted data symbol can correspond to the previously known reference symbol which is transmitted. The previously known reference symbol can have a previously known position in a transmission signal or in a data stream, from which the transmission signal is generated.

The extracted data symbol can therefore correspond to the reference symbol that is transmitted between infrastructure device and receiving device with the signal propagation time. In particular, this means the signal propagation time of the transmission of the data symbol can be determined, wherein the distance is determined as a function of this propagation time.

Due to the signal propagation time, a phase shift is also generated between the transmitted signal and the received signal. Therefore, the reference symbol is also received in a phase-shifted form. For example, the propagation time in the receiver can be determined from the phase difference between the phase angle of the extracted data symbol of the line-of-sight signal and the known, e.g. unshifted, phase angle of the reference symbol.

This advantageously results in a reliable and accurate determination of the distance.

In a further embodiment, the data symbol is correlated with the reference symbol for different phase positions of a reference symbol. The reference symbol used here has been previously explained. Further, a phase offset between the data symbol and the maximally correlated reference symbol is determined, wherein the distance is determined as a function of this phase offset.

In this case, it can be assumed that the reference symbol as well as the carrier frequencies are known in advance, in particular to a vehicle-mounted evaluation device.

The maximally correlated reference symbol can be, for example, the reference symbol with a phase angle for which the magnitude of a cross-correlation coefficient of the correlation between reference and data symbol is a maximum.

It is possible to perform the correlation for different signal propagation times or different phase offset values. A previously known relationship exists between signal propagation time and phase offset, in particular a frequency-dependent relationship.

The signal propagation times or phase offset values for which the correlation is performed can be determined in particular as a function of a GNSS inaccuracy. If, for example, it is known that a current GNSS inaccuracy is equal to a certain value, for example 50 meters, then the interval for the signal propagation times or phase offset values can be determined so as to enable a distance determination with a higher accuracy than that of the current GNSS inaccuracy. The GNSS inaccuracy can be an inaccuracy of the position determination of the vehicle with this GNSS sensor of the vehicle. This can be determinable, for example using the evaluation device.

The phase offset between the previously known phase angle of the reference symbol and the phase angle determined from the correlation can be due to a time offset between the time of transmission of the reference symbol by the infrastructure device and the time of reception of the reference symbol by the receiving device. This time offset, which can be determined as a function of the phase offset, can correspond to a signal propagation time of the transmission signal, in particular the reference symbol, along the line of sight. Depending on the signal propagation time the distance between receiving device and infrastructure device can then be determined, in particular as the product of the signal propagation time and the speed of light.

The distance can be determined by implementation of a so-called ML algorithm, which is described e.g. in section III.B of the paper by A. El Assaad et al., "Distance and vehicle speed estimation in OFDM multipath channels", 2016 21st International Conference on microwave, radar and wireless communications (MIKON) (2016), 1-5. The entire disclosed content of this document can be regarded as part of this disclosure. Therefore, with regard to the determination of the receiving device-specific distance, in particular with regard to the determination of the receiving device-specific receiving direction of the signal, the spatial filtering, and the determination of the receiving device-specific vehicle speed, reference is made to the entire contents of this document.

This advantageously results in an accurate determination of the distance which is computationally easy to implement, and in particular is fast to carry out.

In a further embodiment a vehicle speed is determined as a function of at least two consecutively determined distances.

In particular, the vehicle speed can be determined on the basis of two distances determined in direct succession. For example, the vehicle speed can be determined by calculating a difference between consecutively determined distances and dividing this difference by the time elapsed between the two distance calculations. The time interval between the two calculations can be determined from a periodicity of the transmission of the reference symbol by the infrastructure device. In particular, the vehicle speed can be determined if both of the consecutively determined minimal distances are receiving device-specific distances of the same receiving device, wherein the vehicle speed is then determined from these distances.

This advantageously results in a simple, yet accurate determination of the vehicle speed.

In a further embodiment, the vehicle speed is additionally determined based on the receiving direction. This can be determined, in particular, if the line-of-sight signal is present. This is described in formula 16 of section III.B. of the paper by A. El Assaad et al., "Distance and vehicle speed estimation in OFDM multipath channels", 2016 21st International Conference on microwave, radar and wireless communications (MIKON) (2016), 1-5.

In particular, it is possible for the consecutively determined distances to be the receiving device-specific distances of different receiving devices. In this case, the distances can be determined in a common reference coordinate system, in particular in the vehicle coordinate system.

In a further embodiment, the antenna signals or the digitized antenna signals are transmitted via a UHDR-signal transmission line (Ultra High Data Rate signal transmission line). The UHDR-signal transmission line can be a signal transmission line of the vehicle. In particular, the UHDR-signal transmission line can enable the optical transmission of signals. In addition, the UHDR-signal transmission line can enable a transmission with a transmission rate in a range from 12 to 20 Gbit/s. For example, the UHDR-signal transmission line can be a so-called Thunderbolt transmission line.

For example, the receiving devices can be connected to an evaluation device for the purpose of signal communication via a UHDR-signal transmission line. In an advantageous manner, this allows the transmission of, in particular, digitized antenna signals that were generated with a high sampling rate, for example with the first sampling rate. In particular at the beginning of the distance determination, in order to generate the signal start section an antenna signal can be sampled at a very high sampling rate in comparison.

This advantageously results in a reliable determination of the distance, since the transmission capacity is sufficient to enable the distance determination.

In a further embodiment, for each antenna element of a vehicle-mounted receiving device the antenna signals are digitized before the transmission to a vehicle-mounted evaluation device. In other words, the antenna signals are not digitized in or by the evaluation device, but on the receiving-device side. This advantageously allows a lossless/attenuation-free transmission of the signals between receiving device and evaluation device in the vehicle. In the case of analog transmission (for example, coaxial cable), signal losses could occur due to attenuation and interference, which would need to be compensated, for example using additional hardware (e.g. line amplifiers). For digitally transmitted signals, digital signal processing and error correction algorithms advantageously exist, which render the compensation measures for analog signals unnecessary.

In a further embodiment, the infrastructure device interrupts the sending of the signal for a predetermined period of time. The interruption, which can also be referred to as a transmission pause, is detected by a vehicle-mounted evaluation device. The determination of the distance is carried out, in particular commenced, after detection of the interruption. Thus, the interruption of the transmission of the signal is used as a trigger signal for the angle estimation. The interruption can therefore also act as a trigger signal for the distance determination described above. In particular, a signal edge can be detected, which is generated after the end of the interruption. For example, the transmission of the signal can be interrupted for a period of a maximum of 10 µs. These transmission pauses can be implemented with a predetermined frequency, for example a frequency of 10 Hz. The interruption can be made during a signal transmission as part of the communication of the infrastructure device and the vehicle-mounted evaluation device. Up to now signal transmission of OFDM-signals, in particular LTE signals, has involved continuous signal transmission. During normal transmission behavior of LTE base stations however, there are no transmission pauses that can be used, as previously described, for a reliable angle estimation and thus also a distance determination.

The time of detection of the interruption in the receiver, e.g. by means of the evaluation device, can be in particular the start time for the sampling with the first sampling rate of 2 to 4 giga-samples per second.

It is therefore possible to set the sample rate to the first sampling rate described above after detection of the interruption. Furthermore, after detection of the interruption it is possible to determine the signal start section described above. It is not essential, however, for the start time for the sampling with the first sampling rate to be the start time for the generation of the signal starting section. It is therefore possible to sample with a high sampling rate already during a pause in transmission, but in this case the signal starting section is not generated until after the completion of the transmission pause.

The interruption of the transmission of the signal can be carried out, for example, by switching a transmitting device of the infrastructure device on and off. Also, it is possible to produce the interruption by a binary modulation of the transmission signal, which has a lower modulation frequency compared to the transmission frequency.

If a signal transmission is carried out for the communication and the transmission of the signal is interrupted, then lost signal components of the communication can be reconstructed by means of an appropriate error handling procedure, for example, error handling in the LTE communication. The interruptions are therefore artificial interruptions, which in particular are not otherwise required by the transmission method.

The detection of the interruption advantageously enables a reliable angle estimation for the localization and after a spatial filtering a more accurate determination of the signal propagation time, in particular in the nanosecond range, between transmitter and receiver. In particular, the signal propagation time can be determined more accurately than with methods that are implemented in accordance with the LTE standard and can enable the determination to an accuracy in the region of approximately 1.5 µs. This also enables the distance to be determined more accurately.

In a further embodiment, the determination of the distance is only carried out if a signal energy of the antenna signals is greater than a predetermined threshold. In particular, by means of the vehicle-mounted evaluation device, for example, a signal energy is determined, for example in the form of a signal level. This advantageously prevents transmission signals from more distant infrastructure devices, such as transmitting devices of more remote radio cells, from triggering a distance determination, in particular when the nearest infrastructure device has interrupted the transmission of the signal.

In a further embodiment, for more than one receiving device a receiving device-specific signal propagation time is determined for the distance between the vehicle and infrastructure device as a function of the antenna signals generated by the antenna elements. Furthermore, the receiving device-specific signals of the plurality of receiving devices, in particular the received signals or the line-of-sight signals, are transformed into a common time system according to the signal propagation times. In particular, the receiving device-specific signals can be transformed into a time system of the infrastructure device. Also, the receiving device-specific signals can be transformed into a reference time system of the vehicle. As a result, advantageously the generation of a plurality of signals with the same content is carried out in a common time system. This, in turn, advantageously enables a better signal transmission quality, for example by fusion of the individual receiving device-specific signals.

In a further embodiment a vehicle-mounted transmitting device generates a calibration signal.

The vehicle-mounted transmitting device can comprise at least one transmitting antenna element. The vehicle-mounted transmitting device can also be arranged in a previously known spatial location relative to the receiving devices. For example, a spatial position of the vehicle-mounted transmitting device in the vehicle coordinate system can be known. The vehicle-mounted transmitting device can comprise an antenna structure, in particular a near-field antenna.

The calibration signal can be generated with at least some of the same transmission parameters as the transmission signal of the infrastructure device, in particular with the same transmission frequency and/or the same bandwidth.

Preferably, however, a transmission power of the calibration signal is less than the transmission power of the transmission signal, preferably less than 70 dBm.

The reference symbol described above can be transmitted via the calibration signal.

Furthermore, at least one vehicle-mounted receiving device receives the calibration signal. In particular, each antenna element of the vehicle-mounted receiving device can receive the calibration signal.

The calibration signal can be digitized, in particular with the first sampling rate described, more particularly by means of the A/D converter devices for the digitization of the received signals.

Furthermore, depending on at least one signal characteristic of the calibration signal received by the antenna elements, at least one signal correction factor is determined for at least one antenna element, preferably for each antenna element, of the at least one receiving device. The signal correction factor can be further determined as a function of the previously known spatial position of the vehicle-mounted transmitting device and/or of known (transmission) properties of the calibration signal.

In particular, a factor for correction of the amplitude drift and/or a factor for the correction of the phase drift of a signal received by an antenna element can be determined as the signal correction factor. An amplitude and/or phase drift can be caused in particular by properties of the analog signal transmission path from the antenna elements to the A/D converter devices, e.g. due to temperature fluctuations and/or mechanical vibrations.

In addition, an antenna signal or a digitized antenna signal is corrected in accordance with the at least one signal correction factor. This may mean that the antenna signal is modified or processed in accordance with the signal correction factor.

Therefore, for the at least one receiving device the receiving device-specific distance between vehicle and infrastructure device can be determined as a function of the corrected antenna signal. This allows a more precise determination of the distance in an advantageous way.

In particular, for each antenna element at least one signal property, such as a phase angle and/or an amplitude, of the received calibration signal can be determined. The phase angle can be determined, as previously explained, by the transmitted reference symbol in the received calibration signal being determined and then being correlated for different phase angles with a reference symbol which is phase-shifted according to the respective phase angle.

The signal property can then be compared with a reference signal property, wherein the reference signal property can be determined in accordance with the previously known spatial arrangement of the vehicle-mounted transmitting device and/or the previously known properties of the calibration signal. In addition, the at least one signal correction factor can be determined in such a way that the at least one signal property corresponds to the reference property, or deviates from it by no more than a predetermined amount.

The signal property can be an absolute signal property or a relative signal property. A relative signal property can be, in particular, a signal property of the calibration signal received by an antenna element relative to the signal property of the calibration signal received by at least one other antenna element, for example, a difference between these signal properties.

It is possible to arrange the vehicle-mounted transmitting device with the same spatial distance from all antenna elements of a receiving device, for example, in the center of a receiving device with antenna elements arranged in a circle. In this case, the signal properties of the calibration signal received by each antenna element should be the same, in particular a phase angle and/or amplitude. Therefore, the at least one signal correction factor can be determined in such a way that the signal properties of the calibration signal received by each antenna element are equal, or deviate from each other by no more than a predetermined amount.

The at least one signal correction factor can be determined, in particular, in a transmission pause of the transmission signal, wherein the antenna signals or digitized antenna signals, which are received after this transmission pause, can then be corrected in accordance with the at least one signal correction factor. Therefore, the calibration signal can be generated in the transmission pause. Therefore, after the detection of the interruption of the transmission signal a calibration signal can be generated, but wherein the emission of the calibration signal is terminated before the interruption of the transmission signal is terminated. If the interruption lasts 10 µs, for example, then 1 µs after the detection of the interruption a calibration signal can be sent for 1 to 2 µs.

It is possible that the calibration signal received by each antenna element is sampled with the first sampling rate.

An apparatus for determining a distance between a vehicle and an infrastructure device is also proposed. The apparatus is used for carrying out a method in accordance with one of the embodiments described in this disclosure.

The apparatus is therefore designed in such a way that such a method can be executed by means of the apparatus.

The apparatus comprises at least two vehicle-mounted receiving devices for receiving a signal of the infrastructure device. Furthermore, each vehicle-mounted receiving device comprises at least two antenna elements. The device further comprises at least one evaluation device. The evaluation device can be arranged in the vehicle. The evaluation device can be designed as a microcontroller or FPGA or comprise such a device. The evaluation device can also be provided by a control unit of the vehicle. The receiving devices and the evaluation device can be connected for signal communication. Furthermore, using the evaluation device, for each receiving device a receiving device-specific distance between the vehicle and the infrastructure device can be determined as a function of the antenna signals generated by the antenna elements of the respective receiving device, wherein the shortest possible distance of all receiving device-specific distances can be determined as the distance. This and corresponding advantages have already been explained above.

In a further embodiment, the antenna elements of a vehicle-mounted receiving device are arranged in a circle or in a line. This and corresponding advantages have been explained in more detail above.

In a further embodiment a receiving device comprises at least one A/D converter device for digitizing the antenna signals generated by the antenna elements. The receiving device preferably comprises one A/D converter per antenna element for the digitization of the generated antenna signal. This and corresponding advantages have already been explained above.

In a further embodiment the device comprises at least one UHDR-signal transmission line, wherein at least one receiving device and the evaluation device are connected for signal communication via the at least one UHDR-signal transmission line. This and corresponding advantages have already been explained above.

In a further embodiment the apparatus comprises at least one vehicle-mounted transmitting device for a calibration signal. The vehicle-mounted transmitting device has been explained above and in an advantageous manner enables a calibration of the apparatus, in particular by determining at least one signal correction factor.

The vehicle-mounted transmitting device can in particular be arranged in a previously known spatial location relative to a receiving device, in particular to the antenna elements of a receiving device. In particular, the antenna elements of a receiving device can be arranged in a circle, wherein the vehicle-mounted transmitting device, in particular a transmitting antenna element of the vehicle-mounted transmitting device, can be arranged in the center (midpoint) of the circular arrangement of the antenna elements.

Also proposed is a vehicle. The vehicle comprises an apparatus according to one of the embodiments described in this disclosure.

Also described is an infrastructure device for emitting a signal, in particular an OFDM or LTE signal, for determining a distance between a vehicle and the infrastructure device. Furthermore, by means of the infrastructure device the transmission of the signal can be interrupted for a predetermined period of time. This and corresponding advantages have already been explained above.

Also described is a computer program product, wherein a code is stored in or on the computer program product for executing a method in accordance with one of the embodiments described in this disclosure. In particular, the computer program product can contain a computer program, which has software means for implementing a corresponding method if the computer program is executed in an automation system.

BRIEF DESCRIPTION OF THE SEVERAL VIEWS OF THE DRAWING

The invention will now be described in further detail based on exemplary embodiments. The figures show.

DESCRIPTION OF THE INVENTION

Figure 1:
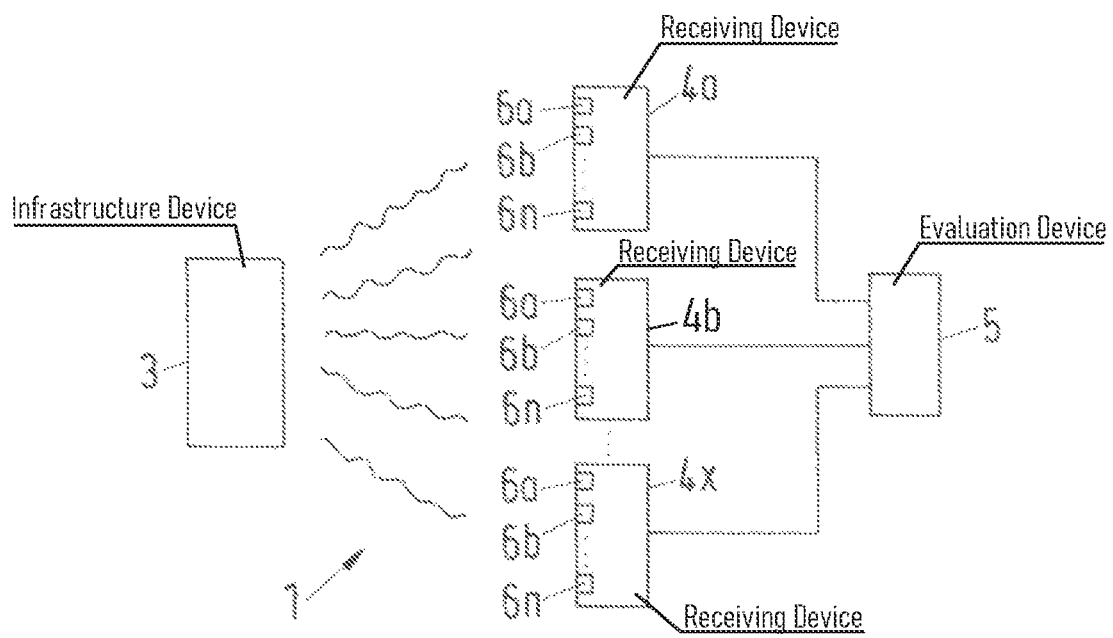
FIG. 1 a schematic block wiring diagram of an apparatus according to the invention, FIG. 2 a schematic arrangement of an infrastructure device and a plurality of receiving devices in a vehicle, FIG. 3 a schematic plan view of a vehicle, FIG. 4 a schematic block wiring diagram of an apparatus according to the invention in a second embodiment, FIG. 5 a schematic functional block wiring diagram of components in a vehicle, FIG. 6 a schematic flow diagram of a method according to the invention, FIG. 7 a schematic time waveform of a transmission signal of an infrastructure device, FIG. 8 a schematic functional block wiring diagram, FIG. 9 a schematic illustration of a UCA receiving device, FIG. 10 a schematic plan view of a dedicated traffic situation of an intersection, FIG. 11 a schematic block wiring diagram of an apparatus according to the invention in a further embodiment and FIG. 12 a schematic illustration of a UCA receiving device with a vehicle-mounted transmitting device.

In the following, identical reference numerals denote elements with identical or similar technical features.

FIG. 1 shows a block wiring diagram of an apparatus 1 according to the invention for determining a distance between a vehicle 2 (see e.g. FIG. 2) and an infrastructure device 3. The infrastructure device 3 can be, for example, a transmitting and receiving device for OFDM signals, in particular LTE signals. For example, the infrastructure device 3 can be a transmitter mast or a part thereof.

The apparatus comprises a plurality of receiving devices $4a, 4b, \ldots, 4x$ and a vehicle-mounted evaluation device 5. The receiving devices $4a, 4b, \ldots, 4x$ are connected to the evaluation device 5 for signal communication. Both the receiving devices $4a, 4b, \ldots, 4x$ and the evaluation device 5 are arranged on board the vehicle.

Each receiving device $4a, 4b, \ldots, 4x$ comprises n antenna elements $6a, 6b, \ldots, 6n$, where n is greater than 1. A transmission signal, which is sent by the infrastructure device 3, is received by the antenna elements $6a, 6b, \ldots, 6n$ of the receiving devices $4a, 4b, \ldots, 4x$. In this case it is possible that only some or all of the antenna elements $6a, 6b, \ldots, 6n$ of some or all of the receiving devices $4a, 4b, \ldots, 4x$ receive the transmission signal. For example, some or all of the antenna elements $6a, 6b, \ldots, 6n$ of one receiving device $4a, 4b, \ldots, 4x$ or a plurality of receiving devices $4a, 4b, \ldots, 4x$ may be hidden, so that the transmission signal is either not received or only with an unwanted time delay.

The antenna signals generated by the antenna elements $6a, 6b, \ldots, 6n$ upon receipt of the transmission signal are transmitted to the evaluation device 5 by the receiving devices $4a, 4b, \ldots, 4x$. To do this, the antenna signals can be digitized. This will be explained in more detail below.

Using the evaluation device 5, in accordance with the antenna signals a receiving device-specific distance d can be determined for each of the receiving devices $4a, 4b, \ldots, 4x$ which transmits antenna signals to the evaluation device 5.

Figure 6:
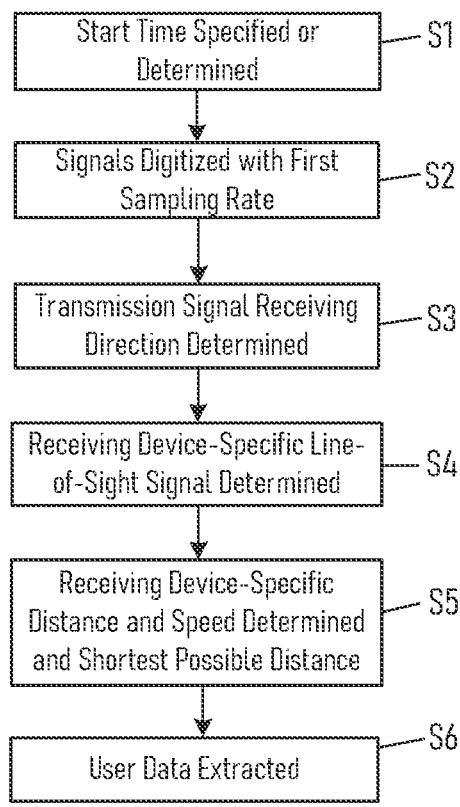

For this purpose, the evaluation device 5 can execute the method illustrated in FIG. 6, for example.

In addition, the evaluation device determines the minimum possible distance of all the receiving device-specific distances as the distance between the vehicle 2 and the infrastructure device 3. For example, it is possible that the receiving device-specific distance between the vehicle and the infrastructure device is determined as a function of a distance between a reference point of the infrastructure device 3 and a reference point of the respective receiving device $4a, 4b, \ldots, 4x$. The reference point of a receiving device $4a, 4b, \ldots, 4x$ can be, for example, a geometric midpoint of the antenna elements $6a, 6b, \ldots, 6n$. A spatial position of the reference point of the receiving device $4a, 4b, \ldots, 4x$ in a vehicle coordinate system of the vehicle 2 can also be known in advance. If this is the case, a distance between the reference point of the infrastructure device 3 and a reference point of the vehicle 2 can also be determined as the distance. If a position of the reference point of the infrastructure device 3 in a global reference coordinate system is known, then the position 2 of the vehicle in this global reference coordinate system can also be determined.

The antenna elements $6a, 6b, \ldots, 6n$ are preferably designed as so-called patch antennas or strip antennas.

Figure 2:
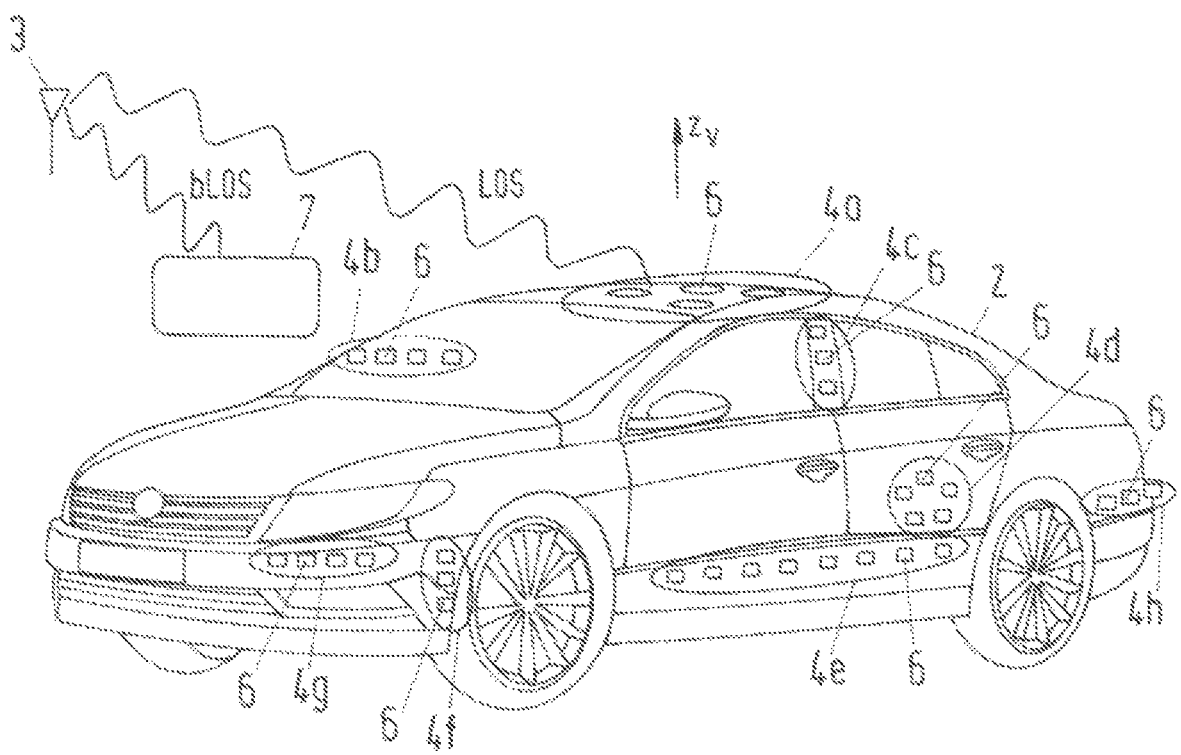

FIG. 2 shows a schematic arrangement of an infrastructure device 3 and a vehicle 2 with a plurality of receiving devices $4a, 4b, 4c, 4d, 4e, 4f, 4h$.

In this case, the antenna elements 6 of the individual receiving devices are shown schematically, wherein for the sake of clarity only one antenna element 6 of each receiving device $4a, \ldots, 4h$ is labeled with a reference numeral.

The vehicle 2 in this example comprises the receiving devices $4a, \ldots, 4h$. Antenna elements 6 of the receiving devices $4a, \ldots, 4h$ are preferably, but not necessarily, arranged in non-metallic parts or elements of the vehicle 2, for example, in a front fender, rear fender, an element of a door trim, in a B-pillar or in a vehicle roof or in a front windshield.

Various designs of the receiving devices 4a, ..., 4h are also illustrated. The antenna elements 6 of a first set of receiving devices 4a, 4d are arranged in a circle and thus form a so-called UCA antenna structure. In this case antenna elements 6 are arranged along a circumference of a circle at a predetermined distance apart from each other. The predetermined distance along the circle can be, for example, in a range of lambda/2 (=half a wavelength of the high-frequency signal used).

The antenna elements 6 of the further set of remaining receiving devices 4b, 4c, 4e, 4f, 4g, 4h are arranged linearly, i.e. along a straight line. The antenna elements 6 of these receiving devices 4b, 4c, 4e, 4f, 4g, 4h thus form so-called ULA-antenna structures.

It is shown that the antenna elements 6 of individual receiving devices 4b, 4e, 4g, 4h of the further set form horizontal ULA-antenna structures, wherein the antenna elements are arranged along a line running parallel to a plane, wherein the plane is oriented perpendicular to a vehicle vertical axis z (yaw axis). The antenna elements 6 of the remaining receiving devices 4c, 4f of the further set each form a so-called vertical ULA-antenna structure, wherein the antenna elements 6 are arranged along a line oriented parallel to the vehicle vertical axis z.

The antenna elements of the receiving devices 4b, 4c, 4e, 4f, 4g, 4h can be arranged along the line a predetermined distance of lambda/2 apart.

Also shown is an infrastructure device 3, which emits the schematically illustrated signals LOS, bLOS. Also shown is the fact that a blocked signal bLOS is blocked by an object 7, for example another vehicle, and therefore cannot be received by any of the antenna elements 6 of the receiving devices 4a, ..., 4h. An unblocked transmission signal LOS is not blocked and can be received, for example, by the antenna elements 6 of the receiving device 4a but also by antenna elements 6 of other receiving devices 4b, ..., 4h. This illustrates that the signal LOS is a so-called line-of-sight signal. This means that the received signal can propagate along a straight line connecting line between the receiving device 4a and the infrastructure device 3.

Depending on the arrangement of the antenna elements 6 of the receiving devices 6 in the vehicle, a receiving direction of the unblocked transmission signal LOS can be determined as a function of the antenna signals. The receiving direction can be determined in a receiving device-fixed or -specific coordinate system, for example, in the coordinate system of a UCA antenna structure or a ULA antenna structure. If the position and orientation of the antenna structures of the receiving devices 4a, ..., 4h in the vehicle coordinate system are known, then a receiving direction can be determined in the vehicle coordinate system also.

Figure 9:
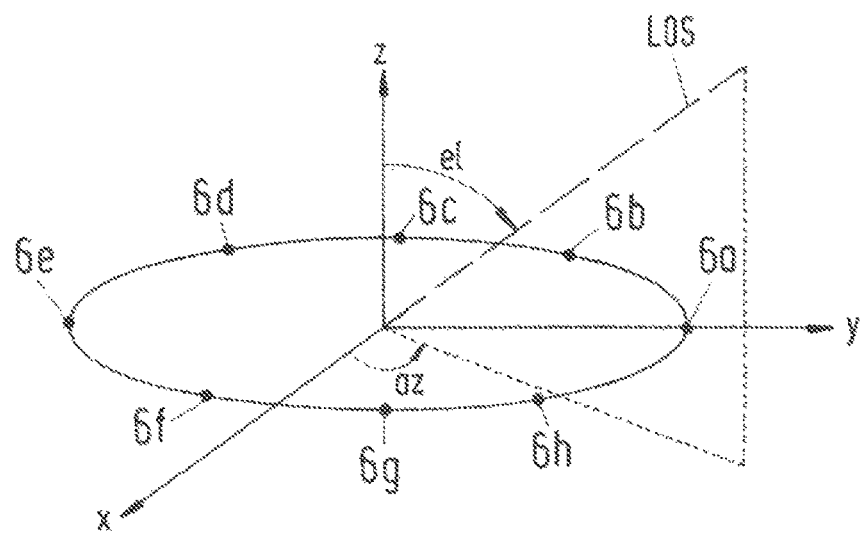

In particular, the receiving direction can be determined in the form of an azimuth angle az and elevation angle el (see FIG. 9). In FIG. 9 this is shown with respect to a coordinate system of a UCA antenna structure. Of course, these angles can also be determined in the vehicle coordinate system, however.

In this case enable the vertical ULA antenna structures shown in FIG. 2 advantageously enable a determination of an elevation angle el and the horizontal ULA antenna structures enable the determination of an azimuth angle az. The ULA antenna structure enables the determination of both angles el, az. In the vehicle coordinate system the azimuth angle az can be determined, for example, in a plane defined by the vehicle longitudinal axis and the vehicle transverse axis. The elevation angle can be determined as an angle between the receiving direction and the vertical axis z of the vehicle.

Figure 3:
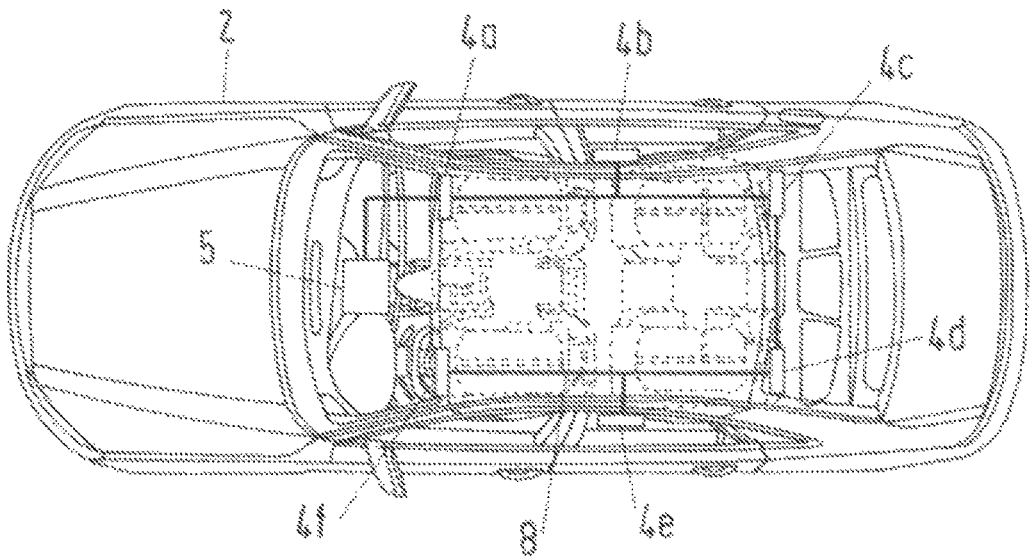

FIG. 3 shows a schematic plan view of a vehicle 2. The vehicle 2 comprises a plurality of receiving devices 4a, 4b, 4c, 4d, 4e, 4f and an evaluation device 5. The evaluation device 5 can comprise a microcontroller or can be designed as such. Also, the evaluation device 5 can comprise an FPGA, or can be designed as such. This shows that the receiving devices 4a, ..., 4f are connected to each other and to the evaluation device 5 for signal communication via a UHDR-signal transmission line 8. The UHDR-signal transmission line allows signal transmission at up to 20 Gbit/s. Such a transmission capacity can be necessary, in particular when the antenna signals are digitized with a high sampling rate. This may be necessary, in particular, for determining a signal start section, which will be explained further below.

Figure 4:
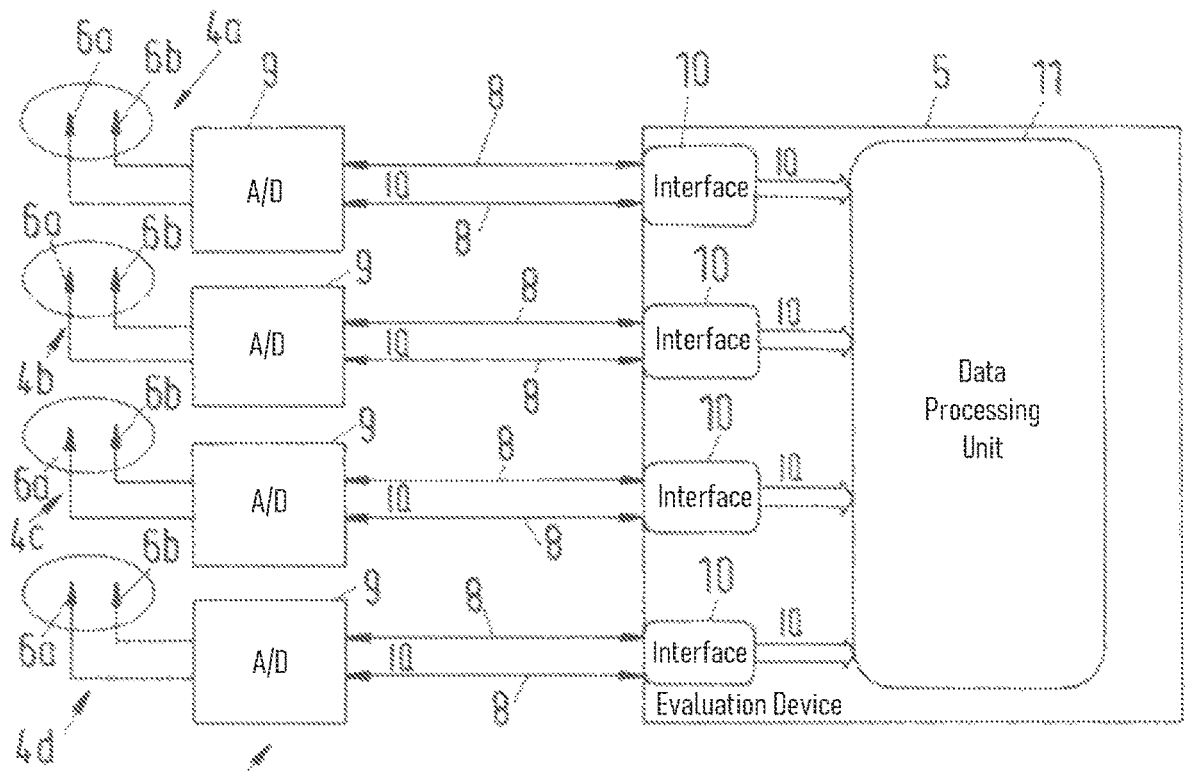

FIG. 4 shows a schematic block wiring diagram of an apparatus according to the invention in a further embodiment. The apparatus 1 in turn comprises a plurality of receiving devices 4a, 4b, 4c, 4d, each with a plurality of antenna elements 6a, 6b. The receiving devices 4a, 4b, 4c, 4d also comprise an A/D converter device 9 in each case. The A/D converter devices 9 are designed here as so-called GSa/s A/D converter devices and enable a digitization of the analog received signals with a sampling rate of up to 2-4 G-samples per second. In the case shown, the antenna signals of all antenna elements 6a, 6b of a receiving device 4a, ..., 4d are digitized by an A/D converter device. Of course, it is also possible that the antenna signals of the antenna elements are each digitized by a separate A/D converter device.

It is also possible, by means of the receiving devices 4a, in particular by means of the A/D converter devices 9, to generate a digitized received signal in the form of an in-phase component I and a quadrature component Q. These components I, Q are then transmitted by the UHDR-signal transmission line 8 shown in FIG. 3 to an evaluation device 5. This comprises interfaces 10 for the UHDR-signal transmission lines 8. Also shown is a processing unit 11 of the evaluation device 5, which performs the signal processing of the transmitted components I, Q, in other words of the transmitted digitized received signal. This data processing can comprise a data modulation, demodulation and data encoding. Furthermore, the distance can be determined by the data processing.

Figure 5:
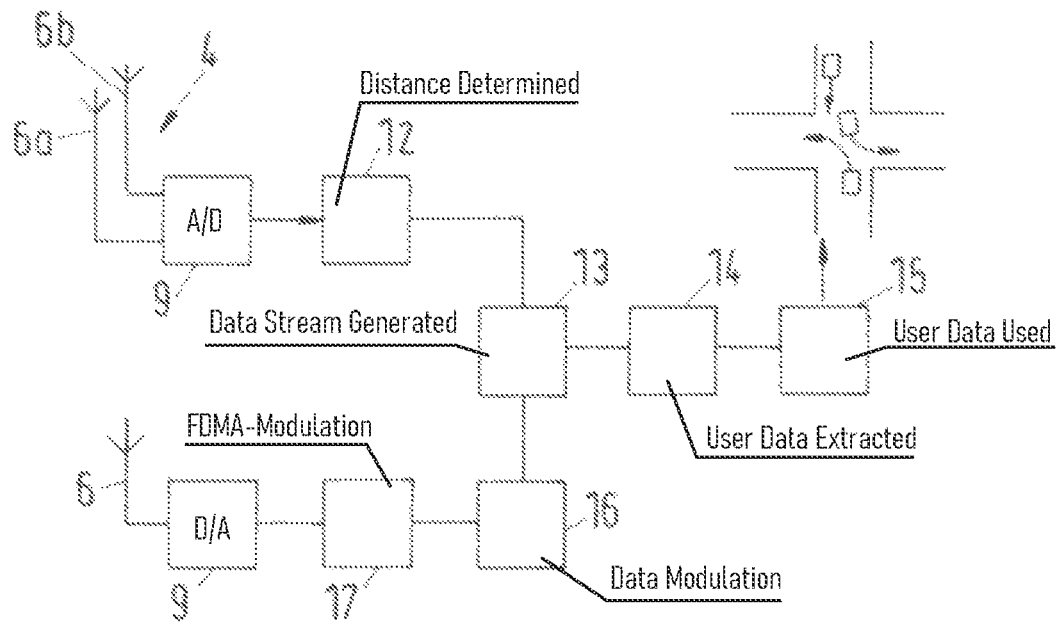

FIG. 5 shows a schematic functional block wiring diagram. A receiving device 4 receives transmission signals of an infrastructure device 3 (see, for example, FIG. 1). The antenna signals of the antenna elements 6a, 6b of the receiving device 4 are digitized, in particular in each case using an A/D converter device 9.

In a further process step 12 a receiver-specific distance is determined between the receiving device 4 and the infrastructure device 3, not shown in FIG. 5. This can be carried out by the evaluation device 5 shown in FIG. 1. In a further process step 13 a process known as framing is carried out, which involves the generation of data flows in a desired format. In a further process step 14, user data can be extracted from the data stream generated in process step 13. In a further process step 15, these user data can be used for a desired application, such as the control of a vehicle assistance system. Also shown is the fact that the data stream or parts thereof generated in process step 13, in particular also extracted user signals, can in turn be sent from the vehicle 2 to external devices, for example, including the infrastructure device 3. For this purpose, in a further process step 16 a data modulation can be carried out, and in a following process step 17 a so-called FDMA-modulation process. In addition, for example by means of the A/D converter device 9 already described, which can also be used as a D/A-converter, a digital signal can be converted into an analog signal and emitted via an antenna element 6. Thus the hardware is used for both localization as well as data transmission. For example, the distance from the vehicle 2, determined according to the invention, can also be transmitted to the infrastructure device 3.

From the functional block wiring diagram shown in FIG. 5, it can be seen that the transmission signal can be used both to determine the distance and to transmit user data. This means that the transmission signal enables, on the one hand, the determination of the distance between vehicle 2 and infrastructure device 3, but at the same time can be used for the transmission of user signals emitted by the vehicle 2, for example to control a vehicle assistance system.

FIG. 6 shows a schematic flow diagram of a method according to the invention for determining a distance between a vehicle 2 and an infrastructure device 3 (see, for example, FIG. 2).

In a first step S1 a start time of the method, i.e. the method for distance determination with angle estimation and spatial filtering, is specified or detected. The transmission of the transmission signal from the infrastructure device 3 can be interrupted, in particular periodically, for a predetermined time interval. The receiving devices 4a, 4b, . . . , 4x (see, for example, FIG. 1) can, however, be used to receive signals continuously. If an interruption or a re-occurring signal transmission after the interruption of the transmit signal is detected, i.e., a pause in transmission, then the start time can be defined as the time at which the re-occurring signal transmission is detected following a pause. An interruption can be detected, for example, if a signal power is less than a predetermined threshold. A re-occurring signal transmission after the interruption can be detected, for example, if the signal power, for example in the form of a signal level, increases above a predetermined threshold. Also, the detection time can be the time at which a rising edge of the signal level is detected.

Of course, however, there are also other possible ways of determining or defining a start time for the distance determination.

To perform the angle estimation and spatial filtering for the extraction of the line-of-sight signal in the receiver, in a second step S2 after the detection of the transmission pause or after the start time of the method, the antenna signals received by the antenna elements 6a, 6b of a receiving device 4 are digitized with a predetermined first sampling rate, which is in the range of 2 to 4 giga-samples/second. Furthermore, a signal start section of each digitized antenna signal is determined. The signal start section in this case comprises the samples that were generated during a predetermined time interval after the start time. Alternatively or cumulatively, the signal start section can comprise a predetermined maximum number of sampling values. The signal start section in this case is referred to as a so-called snapshot of the digitized antenna signals.

It is possible, but not mandatory, that after the determination or generation of the signal start section the sampling rate is reduced from the first sample rate to a further, lower sampling rate, which can be dependent on the signal bandwidth. This is described in the LTE standard, for example. Therefore, a signal starting section does not comprise all the samples of a digitized antenna signal.

In a third step S3, the signal start sections are used as a basis for determining a receiving direction of the transmission signal. For this purpose, the signal starting sections that were generated by the antenna elements 6 of a receiving device 4 or by the antenna elements 6 of a plurality of devices 4 can be used. For example, to determine the receiving direction the signal starting sections, which were generated by antenna elements 6 of a UCA antenna structure, can be evaluated. This advantageously enables the determination of both an azimuth angle az and an elevation angle el (see FIG. 9). The signal starting sections of all antenna elements 6 of a ULA-antenna structure can also be evaluated to determine either an azimuth angle az or an elevation angle el.

The determination of the receiving direction, in particular the determination of an azimuth angle az and an elevation angle el, as a function of the signal starting sections is described using the example of a UCA antenna structure in section III.A. of the paper by A. El Assaad et al., "Distance and vehicle speed estimation in OFDM multipath channels", 2016 21st International Conference on microwave, radar and wireless communications (MIKON) (2016), 1-5.

Between the second step S2 and the third step S3 a signal correction of the analogue or digital antenna signal can be determined in accordance with at least one signal correction factor. This can be determined, as is explained in more detail below, in accordance with a calibration signal, which is emitted by a vehicle-mounted transmitting device 27 (see, for example, FIG. 11).

It is also described in the same section that from a digitized antenna signal, thus no longer exclusively from the signal start section, of a receiving device 4, in a fourth step S4 a receiving device-specific line-of-sight signal can be determined based on the already determined receiving direction. In the fourth step S4 therefore, a signal is determined by computation, which was transmitted along a straight connecting line, i.e. the line-of-sight, from the infrastructure device 3 to the respective receiving device 4. This can also be referred to as spatial filtering of the antenna signals.

In a fifth step S5, the receiving device-specific distance is determined in accordance with the receiving device-specific line-of-sight signal determined in the fourth step S4.

In the fifth step S5, in particular a data symbol can be extracted from the receiving device-specific line-of-sight signal. In addition, this extracted data symbol can be correlated with a reference symbol for different phase angles of this reference symbol. The reference symbol designates a defined symbol, known in advance, which is transmitted by the infrastructure device 3 via or in the transmission signal. The reference symbol used can have a defined, previously known phase angle. In addition, the phase angle is determined for which the correlation between the reference symbol and the data symbol is a maximum. In addition, the propagation time of the receiving device-specific line-of-sight signal is determined as a function of the corresponding phase offset. Further, from this propagation time the distance between the infrastructure device 3 and the receiving device 4 can be determined.

Then, in the fifth step S5 a vehicle speed, in particular a receiving device-specific vehicle speed, can also be determined. This vehicle speed may be determined in particular as a function of at least two, in particular receiving device-specific, distances determined consecutively.

The determination of both the receiving device-specific distance and the receiving device-specific vehicle speed is described e.g. in section III.B of the above-mentioned paper by A. El Assaad et al., "Distance and vehicle speed estimation in OFDM multipath channels", 2016 21st International Conference on microwave, radar and wireless communications (MIKON) (2016), 1-5.

Further, in the fifth step S5 the shortest possible distance of all the receiving device-specific distances can be determined as the resulting distance. It is also conceivable in this case to determine a vehicle speed from two consecutively determined resulting distances.

In a sixth step S6, the transmitted signal or the digitized received signal can be used to extract user data, such as video data, audio data or data for other applications in the vehicle 2.

Figure 7:
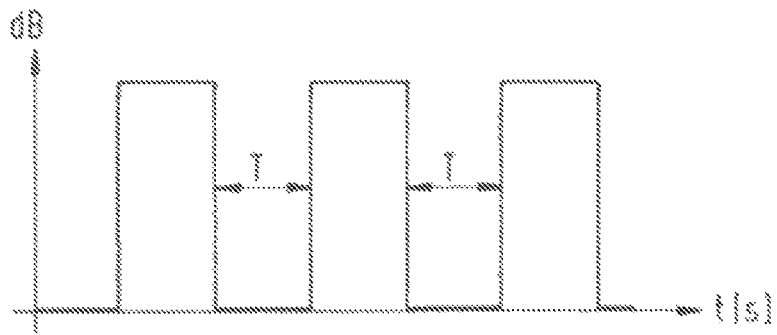

FIG. 7 shows a schematic time waveform of a transmission signal which can be emitted by an infrastructure device 3. This shows that the transmission of the signal is periodically interrupted, wherein an interruption lasts for a predetermined period T. The period T can be, for example, 10 μs. The interruption can be implemented, for example, by a transmitting device of the infrastructure device 3 being deactivated or modulated for the predetermined time interval periodically with a frequency of greater than 5 Hz.

It is also shown that the signal power during the interruption is small, in particular close to 0. During an actual signal transmission, the signal power is greater than a predetermined threshold.

In this case it is possible that the vehicle-mounted evaluation device 5 detects an interruption, and in particular the re-occurring signal transmission following an interruption, wherein the detection time can be used as the start time (trigger time) for the distance determination method according to the invention.

Figure 8:
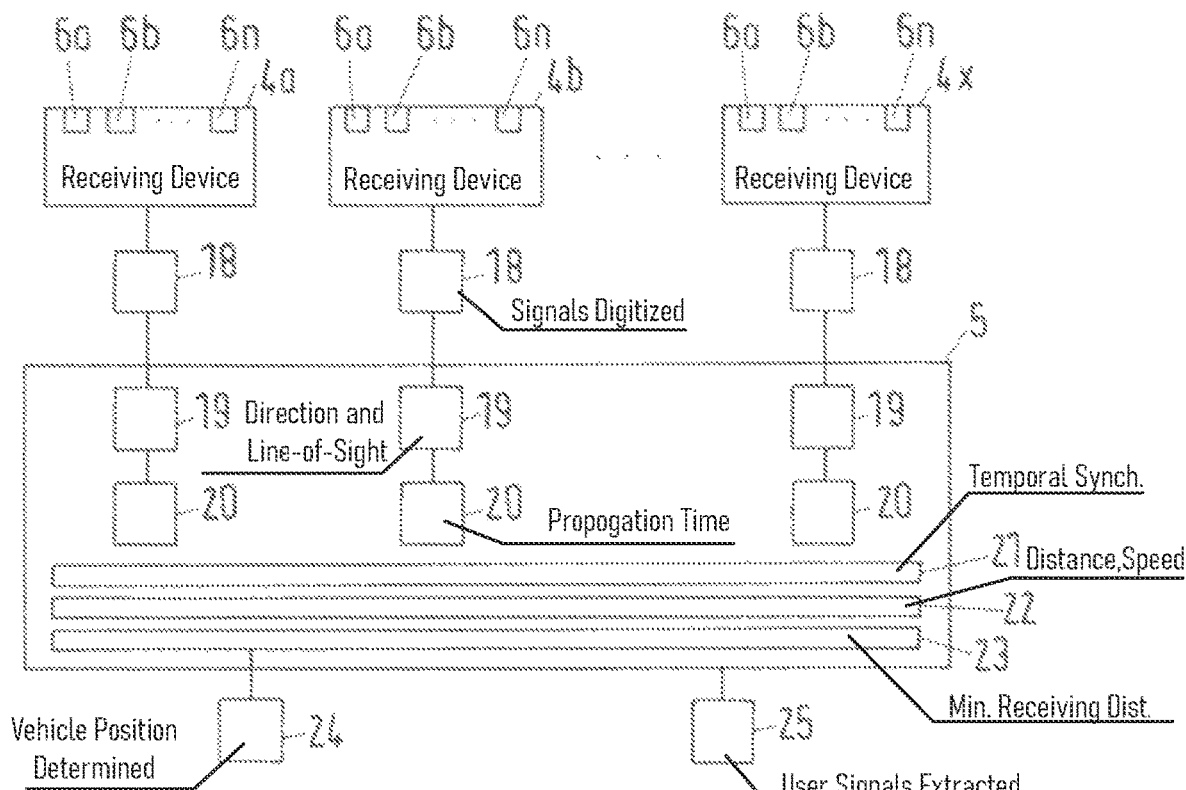

FIG. 8 shows a schematic functional wiring diagram of the teaching according to the invention.

A plurality of receiving devices 4a, 4b, . . . , 4x is shown, each with a plurality of antenna elements 6a, 6b, . . . , 6n. In a process step 18, the received signals which are generated by the antenna elements 6a, 6b, . . . , 6n are at least temporarily digitized with the first sampling rate and transmitted to an evaluation device 5 via a UHDR-signal transmission line 8 (see FIG. 4). In a further process step 19 the evaluation device 5 determines a receiving device-specific receiving direction and a receiving device-specific line-of-sight signal. In a further process step 20, for each receiving device 4a, . . . , 4x a receiving device-specific propagation time of the receiving device-specific line-of-sight signal is determined. In a further process step 21, a temporal synchronization of the receiving device-specific line-of-sight signals can be carried out based on the receiving device-specific signal propagation times of the receiving device-specific line-of-sight signals. In particular, all the receiving device-specific line-of-sight signals can be transformed into a common time system, for example a time system of the infrastructure device 3.

In a subsequent process step 22, a receiving device-specific distance and a receiving device-specific vehicle speed can then be determined for each receiving device 4a, 4b, . . . , 4x.

In a subsequent process step 23 the resulting distance can be determined as the minimum receiving device-specific distance, and the resultant vehicle speed can be determined as the vehicle speed determined by the receiving device 4 that also produces the shortest possible receiving device-specific distance. Then, in the subsequent process step 23, the resulting distance can be used to determine the position of the vehicle in a global reference coordinate system, in particular in which a position of the infrastructure device 3 in the global reference system is known. Information about this position can be transmitted, for example, by the infrastructure device 3 via transmission signals to the vehicle 2, wherein this information can be extracted from the transmission signal as user signals. In addition to the information, further user signals can of course also be extracted from the transmission signal.

If the receiving device and the distance are known, then the vehicle position can be determined from the position of the infrastructure device 3 in the global reference coordinate system as well as in the reference coordinate system. Thus, in a further process step 24 the vehicle position in the global reference coordinate system can be determined. This information can then be transmitted to the infrastructure device 3. The information on the vehicle position in the global reference coordinate system can then be transmitted via the infrastructure device 3 to a central control device, which can control a flow of traffic or generate appropriate control signals based on this information and transmit them to vehicles and/or signaling systems. Of course, information about the vehicle speed can also be transmitted to the infrastructure device 3 and from there to a central control device. In a further process step 25, further user signals can be extracted from the transmission signal and used for in-vehicle applications, for example for controlling a vehicle assistance system.

This therefore enables a simultaneous distance determination and communication.

FIG. 9 shows a schematic diagram of a UCA antenna structure with antenna elements 6a, . . . , 6b, 6c, 6d, 6e, 6f, 6g, 6h. It is also shown that the antenna elements 6a, 6h are arranged along a circular line. Also illustrated is an antenna structure-specific coordinate system with spatial axes x, y, z and an azimuth angle az and an elevation angle el. Also shown is a line-of-sight signal LOS, wherein the azimuth angle az designates an angle between the longitudinal axis x of the coordinate system and a line of the line-of-sight signal LOS which is projected into a plane defined by the longitudinal axis x and the transverse axis y. An elevation angle el designates the angle between the vertical spatial axis z and the line-of-sight signal LOS.

It is of course possible to transform the angles az, el determined in the antenna structure-specific coordinate system, which can also be designated as a receiving device-specific coordinate system, into a vehicle coordinate system if the position and orientation of the antenna structure-specific coordinate system in the vehicle coordinate system is known in advance.

Figure 10:
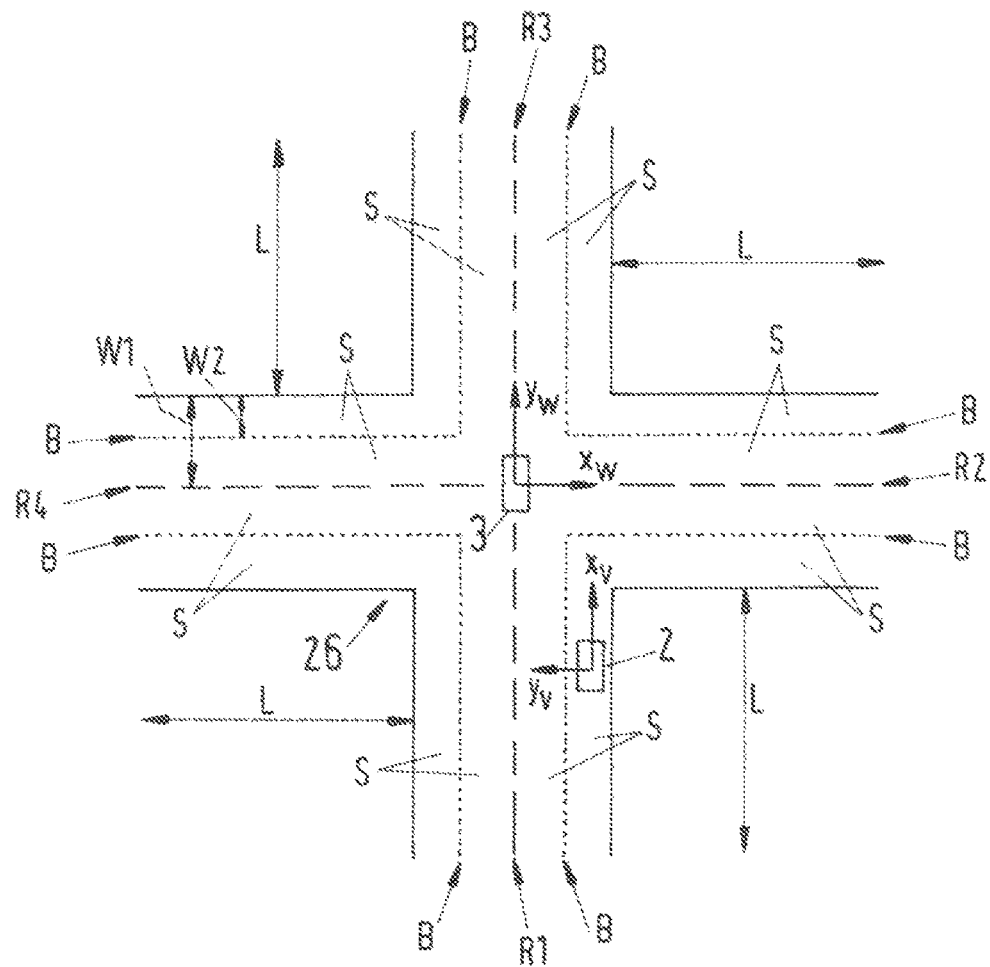

FIG. 10 shows a schematic plan view of a first side of a traffic node in the form of an intersection 26. The intersection consists of four approach roads R1, R2, R3, R4, each with two carriageways B, wherein each carriageway B has two lanes S. Each carriageway B has a width W1. Each lane S has a width W2. It is also evident that the approach roads R1, . . . , R4 each have lengths L. Also shown is a vehicle 2, which is driving on a right-hand lane S of a carriageway B of the first approach road R1.

A vehicle coordinate system is shown, in particular the vehicle longitudinal axis $x_v$ and the vehicle transverse axis $y_v$. A vehicle vertical axis $z_v$ (see also FIG. 2) here is oriented perpendicular to the remaining axes $x_v$, $y_v$ and points towards the observer.

Also shown is a global reference coordinate system with a longitudinal axis $x_w$ and a transverse axis $y_w$. A vertical axis, not shown, of the global reference coordinate system is in this case also oriented perpendicular to the two remaining axes $x_w$, $y_w$ and oriented towards the observer. Also shown is an infrastructure device 3, which can be arranged, for example, at the origin of the global reference coordinate system. The global coordinate system can be a fixed coordinate system relative to a transport node.

The vehicle 2 can comprise an apparatus 1 for distance determination. Using the apparatus 1, as previously explained, a distance can be determined between the vehicle 2 and the infrastructure device 3. In this method, if a receiving direction of a line-of-sight signal LOS is determined, then a position 2 of the vehicle in the global reference coordinate system can then be determined. This position and possibly a vehicle speed can then be used, in particular by a central control device which is not shown, to control a traffic flow of vehicles in the region of the transport node 26. For this purpose, appropriate control signals can be generated by the central control device and transmitted to the respective vehicle 2, for example via the infrastructure device 3.

Simulations have shown that using the proposed method a mean error in the distance of less than 50 cm and an azimuth angle error of less than 1 degree can be obtained, regardless of the vehicle speed.

Figure 11:
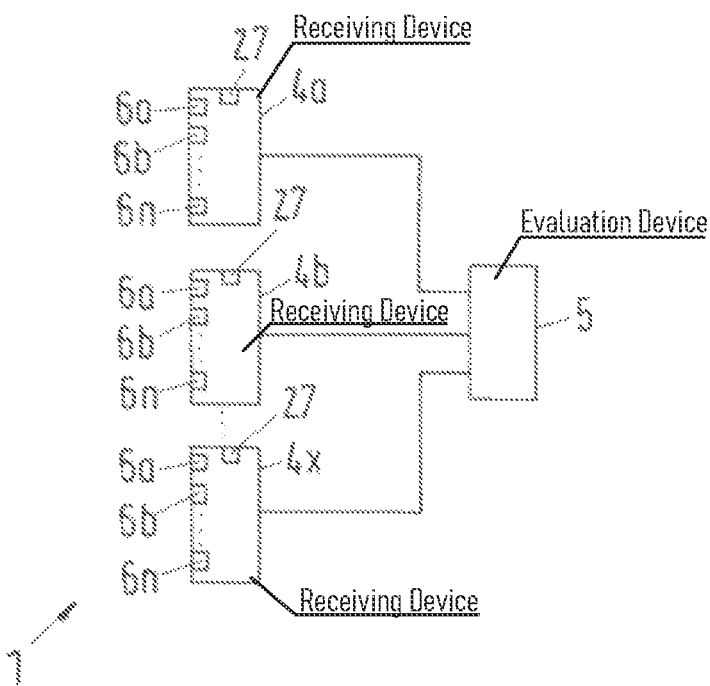

FIG. 11 shows a schematic block wiring diagram of an apparatus 1 according to the invention in a further embodiment. In contrast to the embodiment shown in FIG. 1, the apparatus 1 in this case comprises one vehicle-mounted transmitting device 27 per vehicle-mounted receiving device 4a, 4b, . . . , 4x in order to generate a calibration signal. FIG. 11 shows that these vehicle-mounted transmitting devices 27 are each part of the receiving devices 4a, 4b, . . . 4x. This is not mandatory, however. It is also not necessarily the case that the apparatus 1 comprises one vehicle-mounted transmitting device 27 per vehicle-mounted receiving device 4a, 4b, . . . , 4x in order to generate a calibration signal. Also, the apparatus 1 can comprise only a single vehicle-mounted transmitting device 27 or else only one vehicle-mounted transmitting device 27 each for selected, but not all, vehicle-mounted receiving devices 4a, 4b, . . . , 4x. The vehicle-mounted transmitting devices 27 in this case can be arranged at a previously known spatial location relative to the antenna elements 6 of the vehicle-mounted receiving devices 4a, 4b, . . . , 4x.

Figure 12:
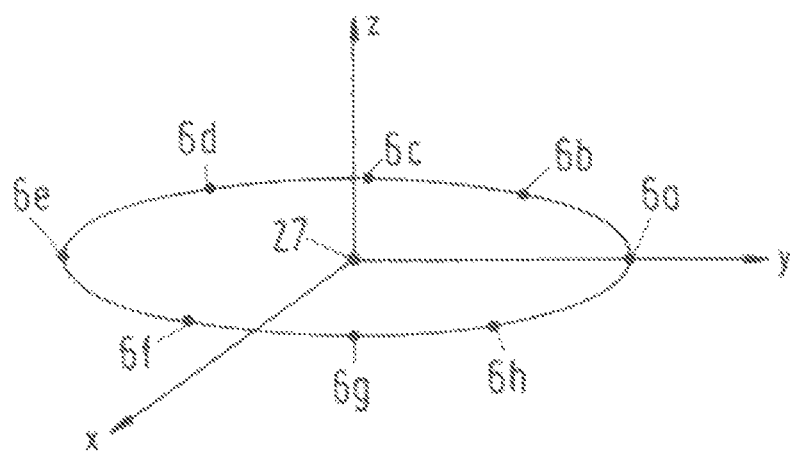

FIG. 12 shows a schematic diagram of a UCA antenna device with antenna elements 6a, 6b, 6c, 6d, 6e, 6f, 6g, 6h and with a vehicle-mounted transmitting device 27. In contrast to the embodiment shown in FIG. 9 a vehicle-mounted transmitting device 27 for a calibration signal is shown, which is arranged at the center point of the circle on the circumference of which the antenna elements 6a, 6b, 6c, 6d, 6e, 6f, 6g, 6h are arranged.

The vehicle-mounted transmitting devices 27 shown in FIG. 11 and FIG. 12 enable the generation of a calibration signal, which can then be received by the antenna elements 6, 6a, 6b, 6c, 6d, 6e, 6f, 6g, 6h of the vehicle-mounted receiving devices 4a, 4b, . . . , 4x.

In addition, depending on at least one signal property of the calibration signal received by the antenna elements 6, 6a, 6b, 6c, 6d, 6e, 6f, 6g, 6h, at least one signal correction factor, e.g. a phase drift and an amplitude drift correction factor, can be determined for each antenna element 6, 6a, 6b, 6c, 6d, 6e, 6f, 6g, 6h of a receiving device 4a, 4b, . . . , 4x. This signal correction factor can be determined in particular on the basis of the previously known spatial position of the vehicle-mounted transmitting device and/or of known (transmission) properties of the calibration signal.

Also, an antenna signal or a digitized antenna signal, which is generated when a transmission signal of the infrastructure device 3 is received, can then be corrected in accordance with the at least one signal correction factor.

LIST OF REFERENCE NUMERALS 1 apparatus
2 vehicle
3 infrastructure device
4, 4a, 4b, . . . , 4x receiving device
5 evaluation device
6, 6a, 6b, . . . , 6n antenna element
7 object
8 UHDR signal transmission line
9 A/D converter device
10 interface
11 data processing unit
12 process step
13 process step
14 process step
15 process step
16 process step
17 process step
18 process step
19 process step
20 process step
21 process step
22 process step
23 process step
24 process step
25 process step
26 intersection
27 vehicle-mounted transmitting device
S1 first step
S2 second step
S3 third step
S4 fourth step
S5 fifth step
S6 sixth step
R1, R2, R3, R4 approach road
B road surface
S driving lane
W1 width of a carriageway
W2 width of a driving lane
L length
x longitudinal axis
y transverse axis
z vertical axis
$x_v$ vehicle longitudinal axis
$y_v$ vehicle transverse axis
$z_v$ vehicle vertical axis
$x_w$ longitudinal axis of the global reference coordinate system
$y_w$ transverse axis of the global reference coordinate system
LOS line-of-sight signal

The invention claimed is:

1. A method for determining a distance between a vehicle and an infrastructure device, which comprises the steps of:
receiving, by at least two vehicle-mounted receiving devices, a signal sent by the infrastructure device, each of the vehicle-mounted receiving devices having at least two antenna elements;
determining for each of the vehicle-mounted receiving devices, a receiving device-specific distance between the vehicle and the infrastructure device in dependence on antenna signals generated by the antenna elements, the distance between the vehicle and the infrastructure device being determined as the receiving device-specific distance that is a shortest receiving device-specific distance of all the determined receiving device-specific distances;

digitizing at least a portion of the antenna signals of the vehicle-mounted receiving devices with a first sampling rate;

determining a signal start section for each digitized antenna signal, the signal start section including all sample values generated in a time interval of a predetermined length after the detection time or after the starting time of the method or the signal start section including a predetermined number of sample values; and determining a receive direction of the signal in dependence on signal start sections.

2. The method according to claim 1, which further comprises reducing the first sampling rate when a predetermined time interval after a beginning of sampling with the first sampling rate has passed and/or when the signal start section contains at least a predetermined number of sample values.

3. The method according to claim 1, which further comprises determining a receiving device-specific line-of-sight signal from the antenna signals of a vehicle-mounted receiving device depending on a receiving direction, each device-specific line-of-sight signal being the signal transmitted along a shortest connecting line between a respective specific receiving device and the infrastructure device.

4. The method according to claim 3, which further comprises determining the receiving device-specific distance in dependence on the receiving device-specific line-of-sight signal.

5. The method according to claim 4, which further comprises extracting a data symbol from the receiving device-specific line-of-sight signal, wherein the receiving device-specific distance is determined depending on the data symbol.

6. The method according to claim 5, wherein the data symbol for different phase positions of a reference symbol is correlated with the reference symbol, wherein a phase offset is determined between the data symbol and a maximally correlating reference symbol, the distance being determined in dependence on the phase offset.

7. The method according to claim 3, which further comprises determining a vehicle speed in dependence on at least two distances determined one after another.

8. The method according to claim 7, which further comprises determining the vehicle speed in dependence on the receiving direction.

9. The method according to claim 1, which further comprises transmitting the antenna signals or digitized antenna signals via an ultra high data rate signal transmission line.

10. The method according to claim 1, wherein for each of the antenna elements of the vehicle-mounted receiving devices the antenna signals are digitized before a transmission to a vehicle-mounted evaluation device.

11. The method according to claim 1, which further comprises:
interrupting a transmission of the signal for a predetermined period of time by the infrastructure device;
detecting an interruption by a vehicle-mounted evaluation device; and
carrying out a determination of the distance after a detection of the interruption.

12. The method according to claim 1, which further comprises carrying out the determination of the distance if signal energy of the antenna signals is greater than a predetermined threshold.

13. The method according to claim 1, wherein for at least two of the vehicle-mounted receiving devices, a receiving device-specific signal propagation time is determined for the distance between the vehicle and the infrastructure device in dependence on the antenna signals generated by the antenna elements, wherein the receiving device-specific signals of a plurality of the vehicle-mounted receiving devices are transformed into a common time system in dependence on signal propagation times.

14. The method according to claim 1, which further comprises generating, via a vehicle-mounted transmitting device, a calibration signal, wherein at least one of the vehicle-mounted receiving devices receives the calibration signal, wherein as a function of at least one signal characteristic of the calibration signal received by the antenna elements of the at least one vehicle-mounted receiving device at least one signal correction factor is determined for at least one antenna element of the at least one vehicle-mounted receiving device, wherein an antenna signal or a digitized antenna signal is corrected depending on the at least one signal correction factor.

15. An apparatus for determining a distance between a vehicle and an infrastructure device, the apparatus comprising:
at least two vehicle-mounted receiving devices for receiving a signal of the infrastructure device, each of said vehicle-mounted receiving devices having at least two antenna elements;
at least one evaluation device configured to determine a receiving device-specific distance between the vehicle and the infrastructure device for each of said vehicle-mounted receiving devices depending on antenna signals generated by said antenna elements, and to determine the distance between the vehicle and the infrastructure device as the receiving device-specific distance that is a shortest receiving device-specific distance of all said determined receiving device-specific distances; and
said at least one evaluation device further configured to:
digitize at least a portion of the antenna signals of the vehicle-mounted receiving devices with a first sampling rate;
determine a signal start section for each digitized antenna signal, the signal start section including all sample values generated in a time interval of a predetermined length after the detection time or after the starting time of the method or the signal start section including a predetermined number of sample values; and
determine a receive direction of the signal in dependence on signal start sections.

16. The apparatus according to claim 15, wherein said antenna elements of at least one of said vehicle-mounted receiving devices are in a circular or linear configuration.

17. The device according to claim 15, wherein said vehicle-mounted receiving devices each have at least one A/D converter device for digitization of the antenna signals generated by said antenna elements.

18. The apparatus according to claim 15, further comprising at least one ultra high date rate (UHDR) signal transmission line, wherein at least one of said vehicle mounted receiving devices and said evaluation device are connected via said UHDR signal transmission line for signal communication.

19. The apparatus according to claim 15, further comprising at least one vehicle-mounted transmitting device for a calibration signal.

20. A vehicle, comprising:
an apparatus for determining a distance between the vehicle and an infrastructure device, said apparatus containing:
at least two vehicle-mounted receiving devices for receiving a signal of the infrastructure device, each of said vehicle-mounted receiving devices having at least two antenna elements;
at least one evaluation device configured to determine a receiving device-specific distance between the vehicle and the infrastructure device for each of said vehicle-mounted receiving devices depending on antenna signals generated by said antenna elements, and to determine the distance between the vehicle and the infrastructure device as the receiving device-specific distance that is a shortest receiving device-specific distance of all said determined receiving device-specific distances; and
said at least one evaluation device further configured to:
digitize at least a portion of the antenna signals of the vehicle-mounted receiving devices with a first sampling rate;
determine a signal start section for each digitized antenna signal, the signal start section including all sample values generated in a time interval of a predetermined length after the detection time or after the starting time of the method or the signal start section including a predetermined number of sample values; and
determine a receive direction of the signal in dependence on signal start sections.

* * * * *